(12) United States Patent
Adachi

(10) Patent No.: US 6,866,800 B2
(45) Date of Patent: Mar. 15, 2005

(54) ELECTROCONDUCTIVE PASTE AND METHOD OF FORMING ELECTRODE PATTERN

(75) Inventor: Fumiya Adachi, Rittou (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 155 days.

(21) Appl. No.: 10/414,109

(22) Filed: Apr. 16, 2003

(65) Prior Publication Data

US 2003/0201426 A1 Oct. 30, 2003

(30) Foreign Application Priority Data

Apr. 26, 2002 (JP) ........................................ 2002-127367

(51) Int. Cl.[7] .............................. H01B 1/22; B05D 5/12
(52) U.S. Cl. ........................ 252/514; 427/96; 427/125
(58) Field of Search ........................... 252/514; 427/96, 427/125, 191, 383.5

(56) References Cited

U.S. PATENT DOCUMENTS 4,001,146 A * 1/1977 Horowitz .................... 252/514
6,689,186 B1 * 2/2004 Hampden-Smith et al. ... 75/255
6,800,223 B2 * 10/2004 Kojo et al. .................. 252/514

FOREIGN PATENT DOCUMENTS

JP          2004-47856     *  2/2004

* cited by examiner

*Primary Examiner*—Mark Kopec
(74) *Attorney, Agent, or Firm*—Dickstein, Shapiro, Morin & Oshinsky, LLP.

(57) ABSTRACT

A conductive paste which can form an electrode having a sufficient solder-wetability, exhibiting sufficient bonding strength, and having a high specific resistance is provided. The conductive paste contains a silver powdery material, glass frit and an organic vehicle. The silver powdery material contains at least about 50% by weight of a high crystalline silver powdery material with a particle size of about 4.5 μm to 7 μm and a crystal size of about 10 nm or more.

20 Claims, 3 Drawing Sheets

RELATIONSHIP BETWEEN GRAIN-SIZE OF POWDER WITH CRYSTAL-SIZE
OF 300 nm AND BONDING STRENGTH

ELECTROCONDUCTIVE PASTE AND METHOD OF FORMING ELECTRODE PATTERN

BACKGROUND OF THE INVENTION

1. Field of the Invention

The present invention relates to an electroconductive paste which is especially adapted to be printed onto a glass substrate and fired to form an anti-clouding heating wire or the like for a motorcar window.

2. Description of the Related Art

Anti-clouding heating wires for motorcar windows have from the standpoint of weather-resistance and price been heretofore formed by printing or coating electroconductive pastes containing silver, and sintering the pastes. However, the standard sizes of glass sheets of motorcar windows are different from each other, depending on the types of the motorcar. The resistance of the formed heating wires are required to have a constant value irrespective of the sizes of the glass sheets. Therefore, the specific resistances of the heating wires are required to be adjusted.

The specific resistance of heating wires which are applied to large-size motorcars and comply with low resistance specifications are from 2 to 3 $\mu\Omega$·cm. On the other hand, the specific resistance of heating wires which are applied to small-size motorcars and comply with high resistance specifications are from 10 to 20 $\mu\Omega$·cm. That is, the specific resistances range widely. The specific resistance of such heating wires are adjusted by increasing the amounts of glass frit in conductive pastes, adding a resistance-controlling agent, or the like. The resistance-controlling agent contains a metal, an oxide or the like which cannot form a solid-solution with the silver. They suppresse the sintering of silver contained in the conductive pastes, and thereby, the specific resistance is adjusted. The resistance-controlling agent is used especially for the heating wires which are formed according to high resistance specifications.

If the amount of glass frit is excessively increased or if the amount of the resistance-controlling agent which is added to adjust the specific resistance of a heating wire is excessively large, the glass frit or the resistance controlling agent is segregated on the surface (firing surface) of the formed heating wire. The glass frit or the resistance-controlling agent segregated on the surface of the heating wire remarkably deteriorates the solder-wetability of the heating wire. Thus, problems are caused in that the bonding strength between the heating wire and a lead wire or the like connected to the heating wire is reduced.

SUMMARY OF THE INVENTION

The present invention has been devised to solve the above-described problems of the related art. It is an object of the present invention to provide an electroconductive paste which can form an electrode having a sufficient solder-wetability, exhibiting no reduction of the bonding strength and having a high specific resistance and also to provide a method of forming an electrode pattern.

According to a first aspect of the present invention, there is provided an electroconductive paste which comprises a silver powdery material, a glass frit and an organic vehicle, the silver powdery material containing at least about 50% by weight of a silver powdery substance with a particle size of about 4.5 $\mu$m to 7 $\mu$m and a crystal size of at least about 100 nm.

Moreover, according to a second aspect of the present invention, there is provided a method of forming an electrode pattern comprising the steps of: preparing an electroconductive paste comprising a silver powdery material, a glass frit and an organic vehicle, the silver powdery material containing at least about 50% by weight of a silver powdery substance with a particle size of about 4.5 $\mu$m to 7 $\mu$m and a crystal size of at least about 100 nm; printing the electroconductive paste onto a substrate in a predetermined pattern; and firing the electroconductive paste to form an electrode pattern having a predetermined shape and size on the substrate.

Firing of a silver powdery substance with a crystal size of at least about 100 nm, namely, a high crystalline silver powdery substance, proceeds slowly compared to that of a silver powdery substance with a crystal size of less than about 100 nm. Thus, the high crystalline silver powdery substance has a rough sintering structure. Accordingly, a sintered material (electrode pattern) formed with an electroconductive paste containing the high crystalline silver powdery substance can have a high resistance. In addition, since firing of the silver powdery substance proceeds slowly, voids are formed in the sintered material, and the molten glass frit or the like is retained in the voids. Accordingly, segregation of the glass frits or the like onto the surface of a formed electrode is retarded. The glass is filled into the voids.

According to the present invention, segregation of the glass or the like onto the surface of the sintered electrode pattern can be suppressed. As a result, the solder-wetability of the electrode surface can be secured. Thus, the cohesive force on the inside of the electrode can be enhanced. As a result, an electrode pattern having a sufficient solder-wetability and a high bonding-strength can be formed.

In particular, the use of the resistance-controlling agent can be suppressed as much as possible due to the employment of the electroconductive paste containing the high crystalline silver powdery substance according to the present invention. Thus, the solder-wetability can be sufficiently secured. Heretofore, the addition amount of an additive or the like, which may deteriorate the solder-wetability, had to be set to be low for the purpose of obtaining an appropriate solder-wetability. In the present invention, however, the sintering is suppressed so that the additive is trapped in voids on the inside of the electrode and segregation on the fired surface can be reduced. That means the addition amount of the additive can be increased so that qualities of the electrode can be stabilized in addition to the solder-wetability. An electroconductive paste suitable for anti-clouding of a motorcar rear window or the like can be provided.

The electroconductive paste of the present invention is suitably used for anti-clouding of a motorcar rear window. In some cases, an intermediate resistance is demanded in addition to the low and high resistance specifications. In many cases, electroconductive pastes of the related art cannot satisfy a specific resistance level of about 7 $\mu\Omega$·cm, which is the lower limit of an electrode formed with the electroconductive paste of the present invention. The electroconductive paste of the present invention can be substituted for such electroconductive pastes of the related art.

DESCRIPTION OF THE PREFERRED EMBODIMENTS

Figure 1:
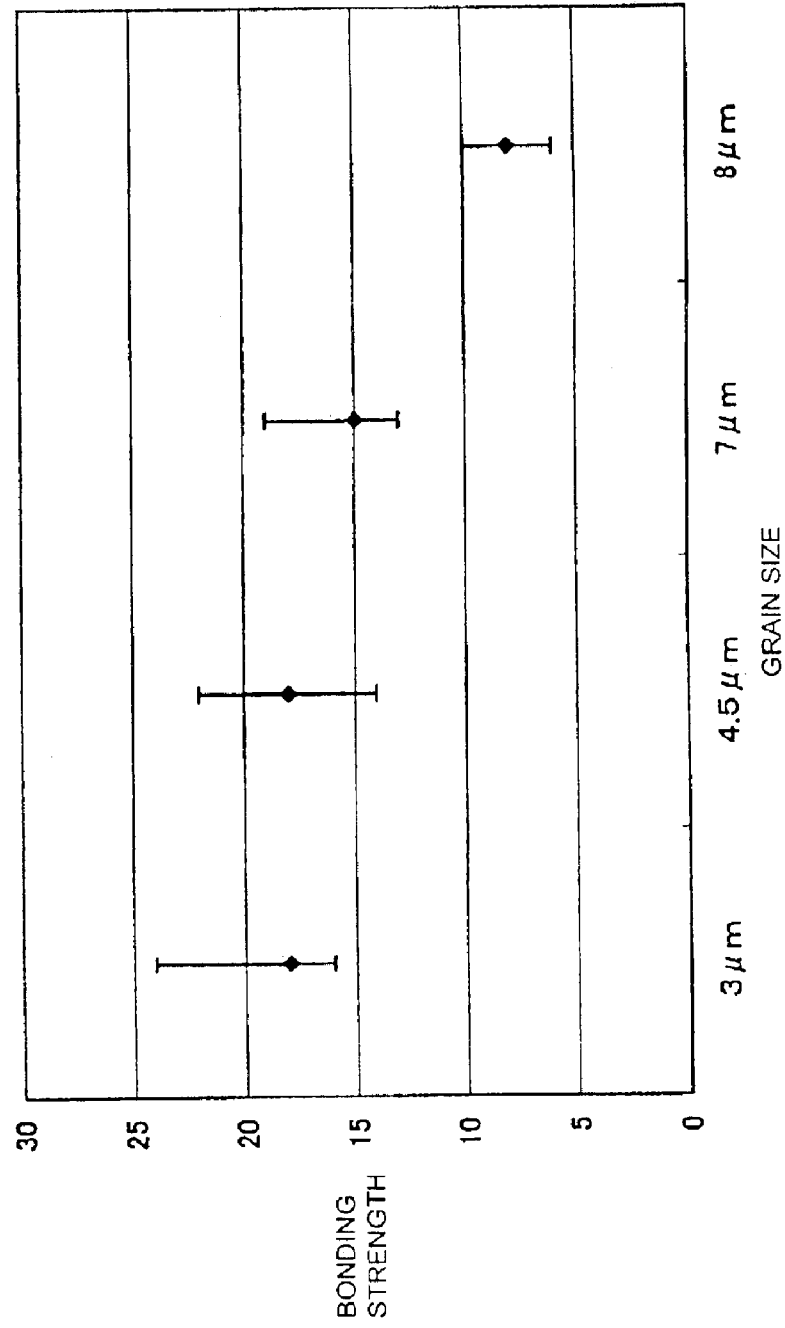
FIG. 1 is a graph showing a relationship between the particle size of a silver powdery material in an electroconductive paste and the bonding strength of an electrode formed by sintering the electroconductive paste.

The electroconductive paste of the present invention contains a silver powdery material, glass frit and an organic vehicle. The conductive paste is suitably used to form electro-conductive stripes (defrosting electrodes), bus bars, and antennas of devices such as AM and FM radio receivers, TV, GPS, and so forth. The conductive stripes are formed, e.g., by printing the conductive paste onto a ceramic color layer formed on a glass substrate, and firing the paste. Most suitably, the conductive paste is used to form an anti-clouding wire of a motorcar window.

The above-described silver powdery material contains a high-crystalline silver powdery substance. The high crystalline silver powdery substance has a crystal-size of at least about 100 nm and a particle size of about 4.5 $\mu$m to 7 $\mu$m. The shape of the grains of the high crystalline silver powdery substance has no pecial limitation. For example, the grains of the powdery substance may have a spherical shape, a block shape, an amorphous shape, or the like.

The term of "particle size" means the means particle size (D50) measured by means of a laser scattering type particle size distribution meter. Also, the "crystal size", when the crystal size is less 100 nm, is obtained by calculation of the half-value width of an Ag (111) plane and that of an Ag (222) plane. The crystal size, when it is at least 100 nm, is obtained by the measurement using TEM observation.

The above-described silver powdery material contains about 50 to 100% by weight of the high crystalline silver powdery substance. The solder-wetability can be sufficiently secured in this case even if a resistance controlling agent comprising a metal oxide is added as an additive so that the specific resistance of an electrode formed with the conductive paste is adjusted to have a desired value. If the amount of the high crystalline silver powdery substance is less than about 50% by weight, the resistance-controlling agent is segregated on the surface of the electrode formed with the conductive paste and solder-wetability can not be secured. In the case in which an additive such as the resistance-controlling agent or the like is not added, the amount of the high crystalline silver powdery substance is preferably set at about 75% by weight or more. Various inorganic metal oxides additives are employed, if necessary, in addition to the resistance-controlling agent, so that the moisture-reliability can be enhanced, coloring on the back side of the electrode, which may cause problems with respect to the appearance, can be improved, and so forth.

The particle size of the high crystalline silver powdery substance is in the range of about 4.5 $\mu$m or higher. If the particle size is less than about 4.5 $\mu$m, the grains of the powdery substance are excessively fine so that the firing-suppressing effect, which is inherent in the high crystalline powdery substance, can not be attained. Moreover, the crystal size is at least about 100 nm. If the crystal size is less than about 100 nm, the firing suppressing effect can hardly be obtained. It is difficult to enhance the specific resistance of an electrode formed with the above-described conductive paste when the firing suppressing effect is reduced.

The particle size of the high crystalline silver powdery substance is in the range of about 7 $\mu$m or less. If the particle size exceeds about 7 $\mu$m, the sintering speed of the conductive paste becomes so low that the paste can not be sufficiently sintered under the firing temperature condition (about 600° C. to 700° C.), and also, the volume of the voids become too large to be sufficiently filled with the glass. This causes the internal cohesive force to be reduced, so that the bonding strength becomes low.

As the high crystalline silver powdery substance, a polycrystalline silver powdery substance with a crystal size of about 100 nm or more or a single crystal silver powdery substance comprising single-crystal grains can be employed. That is, any silver powdery substance with a crystal grain of about 4.5 $\mu$m to 7 $\mu$m may be used. Preferably, the crystal sizes of the high crystalline silver powdery substances are in the range of about 200 to 4000 nm, and more preferably, in the range of about 300 to 3000 nm. Preferably, the particle sizes are in the range of about 4.8 to 6.5 $\mu$m, and more preferably, in the range of about 5.0 to 6.0 $\mu$m. Also, preferably, the content of a silver powdery substance in the conductive paste is in the range of about 40 to 90% by weight, and more preferably, in the range of about 60 to 80% by weight.

The preferred glass frits used according to the present invention are such that they can start softening to flow at a lower temperature than the softening point of the glass of the substrate. The glass frits most preferred are those which start softening to flow at a temperature lower than the softening point (about 730° C.) of soda lime silica glass which is generally used as the glass substrate. The material of the glass frits has no special limitation. Generally, lead borosilicate type glass and bismuth borosilicate type glass, which have a low softening point, are preferably used. The content of the glass frits in the conductive paste is preferably in the range of about 1 to 20% by weight and more preferably in the range of about 3 to 10% by weight.

The organic vehicle employed in the present invention is prepared by dissolving an organic resin having a binder function in a solvent. The organic vehicle has no particular limitation provided that it can form an electroconductive paste having printability. As the organic resin for example, at least one organic resin selected from the group consisting of ethyl cellulose resins, nitrocellulose resins, alkyd resins, acryl resins, styrene resin and phenol resins can be used. As the solvent, for example, at least one solvent selected from α-terpineol, butyl carbitol, and butyl carbitol acetate can be employed. The content of the organic vehicle in the conductive paste is preferably in the range of about 5 to 40% by weight and more preferably in the range of about 10 to 30% by weight.

The conductive paste according to the present invention may contain a resistance-controlling agent.

Most of resistance-controlling agents comprise oxides or substances which are converted to oxides when the agents are fired, and often deteriorate the solder-wetability. The addition amount of a resistance-controlling agent (sintering-suppressing agent) can be reduced as much as possible by employment of the above-described silver powdery substance having a large crystal size, that is, by employment of a silver powdery substance whose sintering proceeds slowly. Moreover, the growth of grains is suppressed, so that the formation of voids can be secured, and the glass frits and the oxides can be retained in the voids. Therefore, segregation of the resistance-controlling agent (sintering-suppressing agent) onto the firing surface can be prevented or retarded. This permits the specific resistance of the electrode to be adjusted while a satisfactory soldering property is secured.

In some cases, a metal oxide is added to the above-described conductive paste in order to enhance the moisture-proof reliability and change the coloring property on the back side of the electrode which can cause a problem on the electrode appearance, rather than for adjustment of the resistance. Such a metal oxide, when an electrode is formed, is segregated on the surface (firing surface) of the electrode and deteriorates the wetability of solder according to the related art. The addition amount, therefore, has to be limited. However, the metal oxide can be retained in the voids on the inside of an electrode by formation of the electrode using the conductive paste of the present invention. Thus, segregation of the metal oxide on the fired surface can be prevented, and the solder-wetability can be secured. Accordingly, additives can be added in sufficient amount, so that electrodes having stable qualities can be formed.

In the case of electrodes having a specific resistance adjusted with resistance-controlling agents (sintering suppressing agents), the additives are present between the silver grains and remarkably disturb the silver grains necking to each other. Accordingly, the inside of the electrodes break according to a cohesion breaking mechanism in a bonding strength test thereof, and moreover, the bonding strength is reduced. On the other hand, the internal strength is enhanced in the case in which the conductive paste of the present invention is used, due to the appropriate necking and cohesive force of the glass. The cohesion breaking mode of a substrate having an electrode formed thereon with the conductive paste of the present invention is caused instead of the bonding-breaking mode. Thus, the bonding strength is enhanced.

The silver powdery material used in the conductive paste of the present invention is preferably a silver powdery mixture comprising the high crystalline silver powdery substance with a particle size of about 4.5 $\mu$m to 7 $\mu$m and a crystal size of at least about 100 nm and another silver powdery substance (hereinafter, referred to as a low crystalline silver powdery substance, if necessary) is used. In this case, preferably, the low crystalline silver powdery substance has a particle size of about 1 $\mu$m to 2 $\mu$m and a crystal size of about 20 to 60 nm. If the particle size of the low crystalline silver powdery material exceeds about 2 $\mu$m, the filling effect of the whole silver powdery material in the conductive paste is deteriorated. This, in some cases, exerts an influence over a printing shape and size formed with the conductive paste. If the particle size is less than about 1 $\mu$m, a desired specific resistance cannot be realized in some cases. It is necessary that the amount of the high crystalline silver powdery substance is at least about 50% by weight. Preferably, the compounding ratio by weight of the high crystalline silver powdery substance to the low crystalline silver powdery substance is in the range of about 50 to 90:50 to 10 and more preferably, in the range of about 60 to 80:40 to 20.

EXAMPLES

Hereinafter, the conductive paste of the present invention will be described with reference to Examples in detail, in which the conductive paste is used as a defroster electrode.

In the examples, a conductive paste was prepared by mixing a 70% by weight of silver powder material, 5% by weight of a Pb—B—Si—O type glass material, and 25% by weight of an organic vehicle containing ethyl cellulose dissolved in α-terpineol, and dispersing them by means of a three roll device.

In the examples, the specific resistance, the bonding strength of a terminal, and the solder-wetability, which are the important functions of defroster electrodes, were determined by the methods which will be described below.

The specific resistance ρ was calculated as follows. The conductive paste was printed on a slide glass substrate (soda lime glass, 260 mm×760 mm×1.4 mm) by means of a pattern suitable for the measurement of specific resistance which has a line length (L) of 200 mm and a line-width (W) of 0.4 mm. The conductive paste was fired under the conditions of 600° C. for 1 minute (in-out five minutes) to form an electrode. The line resistance and film-thickness of the electrode were measured. The specific resistance was calculated by substitution of the line resistance and the film-thickness in the following equation.

$$\rho(\mu\Omega\cdot cm) = \{\text{film-thickness}(\mu m) \times \text{line resistance}(\Omega) \times W/L\} \times 100 = 0.2\{\text{film-thickness}(\mu m) \times \text{line resistance}(\Omega)\}.$$

The line resistance was measured by means of a multimeter (produced by Hwelett Packard Co.). The film-thickness was measured by means of a contact type film-thickness meter (produced by Tokyo Seimitsu Co.). The line resistance and the film-thickness of each sample was measured five times, and the mean value of the measurements was used.

The bonding strength of the terminal was determined as follows. First, the conductive paste prepared as described above was printed in a square pattern with a one-side length of 2 mm on the surface of a slide glass substrate (soda lime glass, 260 mm×760 mm×1.4 mm), dried at 150° C. for 10 minutes, and fired at 600° C. for 1 minute (in-out 5 minutes). Thereafter, the slide glass substrate having the electrode formed thereon was placed onto a plate heated at 150° C. A lead-terminal was soldered to the electrode.

As the lead-terminal, an L-shaped solder-coated copper wire with a diameter of 0.6 mm was used. As the solder, an Sn—Pb—Ag type solder was used. A flux prepared by dissolving rosin in isopropyl alcohol was used.

Then, the lead terminal was tensile-deformed by means of an autograph (manufactured by Shimadzu Corporation) to determine the peeling strength of the lead terminal when it was peeled from the electrode. The peeling strength was taken as the bonding strength of the lead terminal. The peeling strength which is sufficient for practical use is 10 N or higher per 2 mm square ("2 mm□").

The solder-wetability was determined as follows.

The conductive paste prepared as described above was printed in a circular pattern with a diameter of 5 mmφ on a slide glass substrate (soda lime glass, 100 mm×100 mm×1.4 mm), dried at 150° C. for 10 minutes, and fired at 600° C. for 1 minute (in-out 5 minutes) to form an electrode. Thereafter, the surface of the electrode was cleaned with the above flux. The substrate having the electrode was dipped in a soldering bath containing an Sn—Pb—Ag type solder for 2 to 3 seconds. The solder-wetability of the electrode was judged by visual observation of the appearance of the dipping-treated electrode surface. If the solder covers the whole surface area of the electrode (wetted), the solder-wetability was determined to be good. If even a part of the electrode is not wetted, the solder-wetability was determined to be poor.

Example 1

In Example 1, silver powdery substances with different particle sizes and crystal sizes were employed for conductive pastes. The specific resistances of the electrodes formed with the conductive pastes were determined.

The conductive pastes were prepared using silver powdery substances having the relations between the particle size and the crystal size shown in Table 1 and at the above-described basic compounding ratios. Table 1 also shows the results.

TABLE 1

Relationship between particle size, crystal size, and specific resistance
Unit: $\mu\Omega \cdot cm$

| Particle size | Crystal size | | | | |
|---|---|---|---|---|---|
| | 60 nm | 100 nm | 300 nm | 1000 nm | 3000 nm |
| 3 μm | 3 μΩ·cm | 5 μΩ·cm | 6 μΩ·cm | — | — |
| 4.5 μm | 3 μΩ·cm | 7 μΩ·cm | 12 μΩ·cm | 13 μΩ·cm | — |
| 7 μm | 4 μΩ·cm | 15 μΩ·cm | 17 μΩ·cm | 19 μΩ·cm | 20 μΩ·cm |
| 9 μm | 4 μΩ·cm | — | 20 μΩ·cm | — | 22 μΩ·cm |

Table 1 shows that for the conductive pastes containing the silver powdery substance with a particle size of 3 μm, the specific resistances are not remarkably increased with the crystal size. Thus, it is seen that in the case of the above-described particle size, the crystal size exerts no significant influence over the sintering properties of the electrode formed with the conductive pastes under the predetermined firing conditions.

On the other hand, for the conductive pastes containing the silver powdery materials of which the particle sizes are in the range of about 4.5 μm and more, the specific resistance is significantly increased with the crystal size of not less than 100 nm. This change of the specific resistance occurs since the electrodes formed with the conductive pastes are slowly sintered under the predetermined firing conditions to have rough structures. The conductive paste containing the silver powdery substance with a particle size of 4.5 μm, permits electrodes which satisfy the lowest specific resistance requirement, that is, 10 μΩ·cm, preferably 12 μΩ·cm, required by the high resistance specification can be formed.

Example 2

In Example 2, the silver powdery substances in all of the conductive pastes had the same crystal size of 300 nm, while the particle sizes were different from each other. The bonding strengths were measured according to the above-described measurement method. The conductive pastes were prepared according to the above-described basic compounding ratios. For the conductive pastes containing the silver powdery substances with a crystal size of 300 nm, the relations between the particle sizes and the bonding strengths were compared. FIG. 1 shows the results.

As seen in FIG. 1, the electrodes formed with the above-described conductive pastes containing silver powdery substances having the particle sizes of 7 μm and lower secure a bonding strength of 10 N/2 mm □ or higher which is suitable for practical use. However, the bonding strength is considerably decreased when the particle size of the silver powdery substance is 8 μm. The bonding-breaking mode of the electrode having the bonding strength remarkably reduced is a cohesion-breaking type. It is supposed that this occurs since the necking points between the grains are reduced in number and the filling effect of the glass on the voids is insufficient in the structures of the electrodes which are formed by firing the conductive pastes at a firing peak temperature of 600° C. to 700° C.

A conductive paste which provides an electrode with a high specific resistance and a sufficient bonding strength can, as seen in Examples 1 and 2, be produced by setting the crystal size of a silver powdery substance for the conductive paste at about 100 nm or larger and also setting the particle size of the silver powdery to be in the range of about 4.5 μm to 7 μm.

Example 3

Silver powdery substances with different crystal sizes were compounded at different compounding ratios in the conductive pastes, respectively. The specific resistances and the solder-wettabilities obtained when an oxide was added were estimated.

Figure 2:
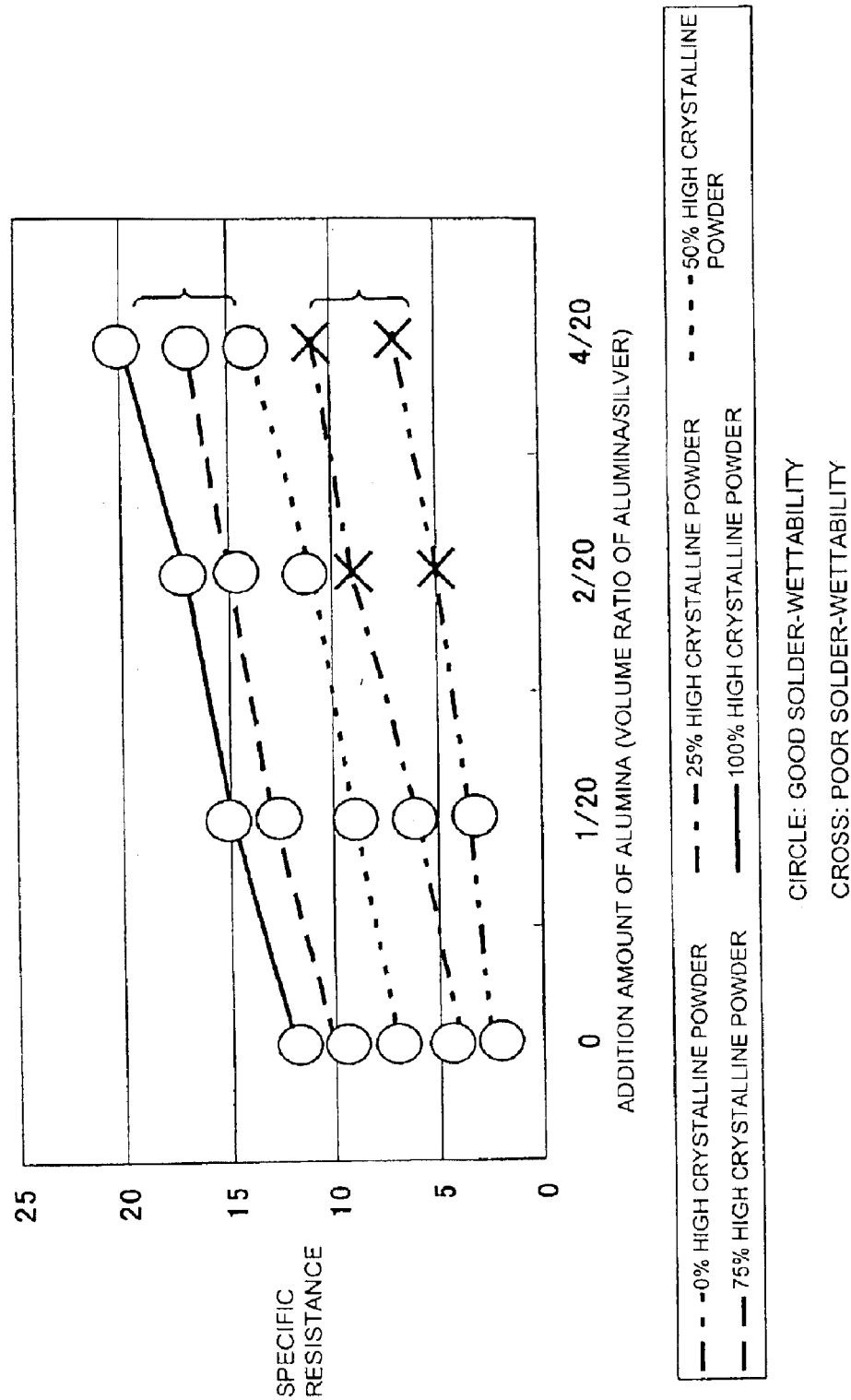
FIG. 2 is a graph showing a relationship between alumina added to an electroconductive paste and the specific resistance and solder-wetability of an electrode formed by sintering the electroconductive paste.

As the silver powdery substances, a silver powdery substance having a particle size of 4.5 μm and a crystal size of 60 nm and a silver powdery substance (high crystalline silver powder) with a particle size of 4.5 μm and a crystal size of 300 nm were used. The silver powdery substances were separately used or were mixed at weight ratios of 25/75, 50/50, and 75/25. Alumina powdery materials ($Al_2O_3$) as the resistance-controlling agents were added to the basic compounds containing the silver powdery substances at volume ratios of alumina to silver of 1/20, 2/20, and 4/20. The produced compounds were dispersed by means of a three-roll device. The specific resistance and the solder-wet ability were evaluated according to the above-described procedures using the conductive pastes. FIG. 2 shows the results.

FIG. 2 shows that for the conductive pastes using the silver powdery material containing at least 75% by weight of the high crystalline silver powdery substance, the solder-wetability, without the resistance-controlling agent being added, was secured even in the range of the specific resistance of 10 μΩ·cm and higher, which is the specific resistance level required by the high resistance specification. Moreover, it is seen that even if the resistance-controlling agent is added, the solder-wetability is secured in the specific resistance range required for high resistance products.

For the conductive pastes using the silver powdery material containing at least about 50% by weight of the high crystalline silver powdery substance, it is seen that the solder-wetability can be also secured in the specific resistance range of 10 μΩ·cm and higher required for high resistance products, due to the addition of the specific resistance agent.

On the other hand, it is seen that for the conductive pastes using the silver powder materials containing larger amounts of the low crystalline silver powdery substances, respectively, even if alumina is added to the limit at which the solder-wetability can be secured, the specific resistance does not reach the above-described level.

Example 4

Figure 3:
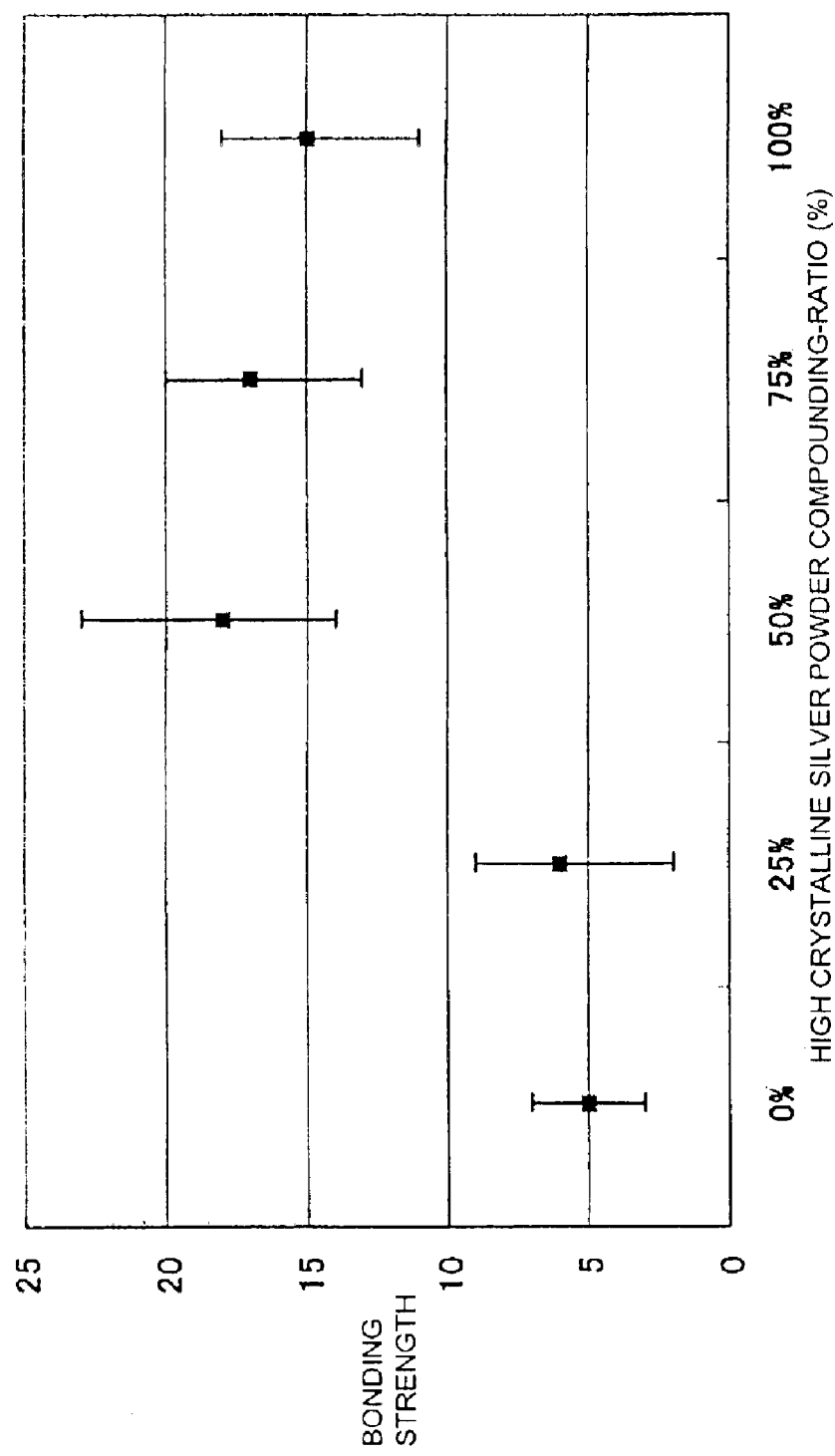
FIG. 3 is a graph showing the compounding amount of a high crystalline silver powdery substance contained in an electroconductive paste and the bonding strength of an electrode formed by sintering the electroconductive paste.

Conductive pastes were prepared by adding alumina as the resistance-controlling agent to the conductive pastes described in Example 3 at a volume ratio of alumina/silver of 4/20, respectively. For electrodes formed with the conductive pastes, the bonding strengths were estimated according to the above-described procedures. FIG. 3 shows the results.

FIG. 3 shows that for electrodes formed with conductive pastes using the silver powdery materials containing at least about 50% by weight of the high crystalline silver powdery substance, the bonding strengths were 15 N/2 mm □ or higher on average, which are above the practically required strength.

On the other hand, each bonding strength for the electrodes formed with the conductive pastes using the silver powdery materials containing the low crystalline silver powdery substance in large amounts (the silver powdery materials containing the high crystalline silver powdery substance in amounts of 0% by weight or 25% by weight), is lower than the strength for practical applications.

Examples 3 and 4 show that conductive pastes which exhibit a high specific resistance and a sufficient bonding strength can be provided by setting the content of high crystalline silver powdery substance at about 50% by weight or higher based on the whole silver powdery material in the conductive paste.

What is claimed is:

1. An electroconductive paste comprising a silver powdery material, a glass frit and an organic vehicle,
    wherein the silver powdery material comprises at least 50% by weight of a high crystalline silver powdery substance with a particle size of about 4.5 $\mu$m to 7 $\mu$m and a crystal size of at least about 100 nm.

2. An electroconductive paste according to claim 1, further comprising a metal oxide resistance-controlling agent.

3. An electroconductive paste according to claim 1, wherein said high crystalline silver powder substance has a particle size of about 4.8 to 6.5 $\mu$m and a crystal size of about 200 to 4000 nm.

4. An electroconductive paste according to claim 1, wherein said high crystalline silver powdery substance has a particle size of about 5 to 6 $\mu$m and a crystal size of about 300 to 3000 nm.

5. An electroconductive paste according to claim 1, wherein said high crystalline silver powdery substance is about 40 to 90% by weight of the paste.

6. An electroconductive paste according to claim 5, wherein said high crystalline silver powder substance is about 60 to 80% by weight of the paste.

7. An electroconductive paste according to claim 5, wherein said glass frit has a softening temperature lower than about 730° C. and is about 1 to 20% of the paste, and wherein said organic vehicle is about 5 to 40% of the paste.

8. An electroconductive paste according to claim 7, wherein said high crystalline silver powder substance has a particle size of about 4.8 to 6.5 $\mu$m and a crystal size of about 200 to 4000 nm.

9. An electroconductive paste according to claim 8, wherein said high crystalline silver powder substance has a particle size of about 4.8 to 6.5 $\mu$m and a crystal size of about 200 to 4000 nm.

10. An electroconductive paste according to claim 5, wherein said glass frit is about 3 to 1% of the paste, and said organic vehicle is about 10 to 30% of the paste.

11. An electroconductive paste according to claim 1, wherein said silver powder material comprises at least 10% by weight of a low crystalline silver powdery substance with a particle size of about 1 to 2 $\mu$m and a crystal size of about 20 to 60 nm.

12. An electroconductive paste according to claim 11, wherein said high crystalline silver powdery substance has a particle size of about 5 to 6 $\mu$m and a crystal size of about 300 to 3000 nm and is about 60 to 80% by weight of the paste.

13. An electroconductive paste according to claim 11, wherein said silver powder material comprises about 20 to 40% by weight of said low crystalline silver powdery substance and about 60 to 80% by weight of said high crystalline silver powdery substance.

14. A method of forming an electrode pattern comprising the steps of:
    providing an electroconductive paste comprising a silver powdery material, a glass frit and an organic vehicle, the silver powdery material comprising at least 50% by weight of a high crystalline silver powdery substance with a particle size of about 4.5 to 7 $\mu$m and a crystal size of at least about 100 nm;
    printing the electroconductive paste onto a substrate in a predetermined pattern; and
    firing the electroconductive paste to form an electrode pattern having a predetermined shape and size on the substrate.

15. A method of forming an electrode pattern according to claim 14, wherein the firing is carried out at a temperature of about 600 to 700° C.

16. A method of forming an electrode pattern according to claim 15, wherein the substrate is a glass substrate.

17. A method of forming an electrode pattern according to claim 14, wherein the substrate is a glass substrate.

18. A method of forming an electrode pattern according to claim 14, wherein said electroconductive paste containing a metal oxide resistance-controlling agent.

19. A method of forming an electrode pattern according to claim 14, wherein said silver powder material comprises at least 10% by weight of a low crystalline silver powdery substance with a particle size of about 1 to 2 $\mu$m and a crystal size of about 20 to 60 nm.

20. A method of forming an electrode pattern according to claim 19, wherein said electroconductive paste containing a metal oxide resistance-controlling agent.

* * * * *